(12) United States Patent
Xu et al.

(10) Patent No.: US 12,082,280 B2
(45) Date of Patent: Sep. 3, 2024

(54) QUALITY OF EXPERIENCE OPTIMIZATION TO MEET VARIABLE NETWORK DEMANDS

(71) Applicant: AT&T Intellectual Property I, L.P., Atlanta, GA (US)

(72) Inventors: Tan Xu, Bridgewater, NJ (US); Rashmi Palamadai, Naperville, IL (US); Brian Novack, St. Louis, MO (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 350 days.

(21) Appl. No.: 17/656,120

(22) Filed: Mar. 23, 2022

(65) Prior Publication Data

US 2023/0309164 A1    Sep. 28, 2023

(51) Int. Cl.
*H04W 76/15*    (2018.01)
*H04W 4/50*    (2018.01)
*H04W 24/04*    (2009.01)
*H04W 28/02*    (2009.01)
*H04W 28/24*    (2009.01)

(52) U.S. Cl.
CPC .......... *H04W 76/15* (2018.02); *H04W 4/50* (2018.02); *H04W 24/04* (2013.01); *H04W 28/0268* (2013.01); *H04W 28/24* (2013.01)

(58) Field of Classification Search
CPC .................................................. H04W 76/15
See application file for complete search history.

(56) References Cited

U.S. PATENT DOCUMENTS

| 9,538,401 B1 * | 1/2017 | Ouyang ................ H04W 16/22 |
| 2020/0195521 A1 * | 6/2020 | Bogineni ............ H04L 41/5022 |
| 2021/0029216 A1 * | 1/2021 | Stockert ............. G06F 16/2365 |

* cited by examiner

*Primary Examiner* — Hsinchun Liao

(57) ABSTRACT

In one example, a method includes instructing a mobile device of a user to establish a connection with an application server via a first network slice, where the first network slice is configured based on an initial resource need of a network connected application executing on the mobile device and an initial set of network conditions, sending, to the mobile device, a prediction of at least one network condition for the first network slice at a time in the future, receiving, from the mobile device, an indication of an updated resource need of the network connected application, and providing, to the mobile device, instructions for establishing a connection to the application server over a second network slice, where the second network slice is configured based on the updated resource need and a current set of network conditions.

20 Claims, 4 Drawing Sheets

QUALITY OF EXPERIENCE OPTIMIZATION TO MEET VARIABLE NETWORK DEMANDS

The present disclosure relates generally to mobile media networks, and relates more particularly to devices, non-transitory computer-readable media, and methods for optimizing quality of experience to meet variable network demands in a mobile media network.

BACKGROUND

Mobile devices (e.g., smart phones, tablet computers, wearable devices, and the like) are often used to engage with network connected applications, such as streaming music and video applications, gaming applications, and others. At the same time, many of these applications are offering more immersive experiences, such as gaming applications that leverage extended reality (XR) technology, or streaming video applications that can control co-located Internet of Things (IoT) devices. Different applications have different requirements for uplink and downlink latency, throughput, and packet loss rates depending on quality of experience (QoE) targets and/or other performance requirements.

SUMMARY

In one example, the present disclosure describes a device, computer-readable medium, and method for optimizing quality of experience to meet variable network demands in a mobile media network. For instance, in one example, a method performed by a processing system including at least one processor includes instructing a mobile device of a user to establish a connection with an application server via a first network slice, where the first network slice is configured based on an initial resource need of a network connected application executing on the mobile device and an initial set of network conditions, sending, to the mobile device, a prediction of at least one network condition for the first network slice at a time in the future, receiving, from the mobile device, an indication of an updated resource need of the network connected application, and providing, to the mobile device, instructions for establishing a connection to the application server over a second network slice, where the second network slice is configured based on the updated resource need and a current set of network conditions.

In another example, a non-transitory computer-readable medium stores instructions which, when executed by a processing system, including at least one processor, cause the processing system to perform operations. The operations include instructing a mobile device of a user to establish a connection with an application server via a first network slice, where the first network slice is configured based on an initial resource need of a network connected application executing on the mobile device and an initial set of network conditions, sending, to the mobile device, a prediction of at least one network condition for the first network slice at a time in the future, receiving, from the mobile device, an indication of an updated resource need of the network connected application, and providing, to the mobile device, instructions for establishing a connection to the application server over a second network slice, where the second network slice is configured based on the updated resource need and a current set of network conditions.

In another example, a device includes a processing system including at least one processor and a computer-readable medium storing instructions which, when executed by the processing system, cause the processing system to perform operations. The operations include instructing a mobile device of a user to establish a connection with an application server via a first network slice, where the first network slice is configured based on an initial resource need of a network connected application executing on the mobile device and an initial set of network conditions, sending, to the mobile device, a prediction of at least one network condition for the first network slice at a time in the future, receiving, from the mobile device, an indication of an updated resource need of the network connected application, and providing, to the mobile device, instructions for establishing a connection to the application server over a second network slice, where the second network slice is configured based on the updated resource need and a current set of network conditions.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
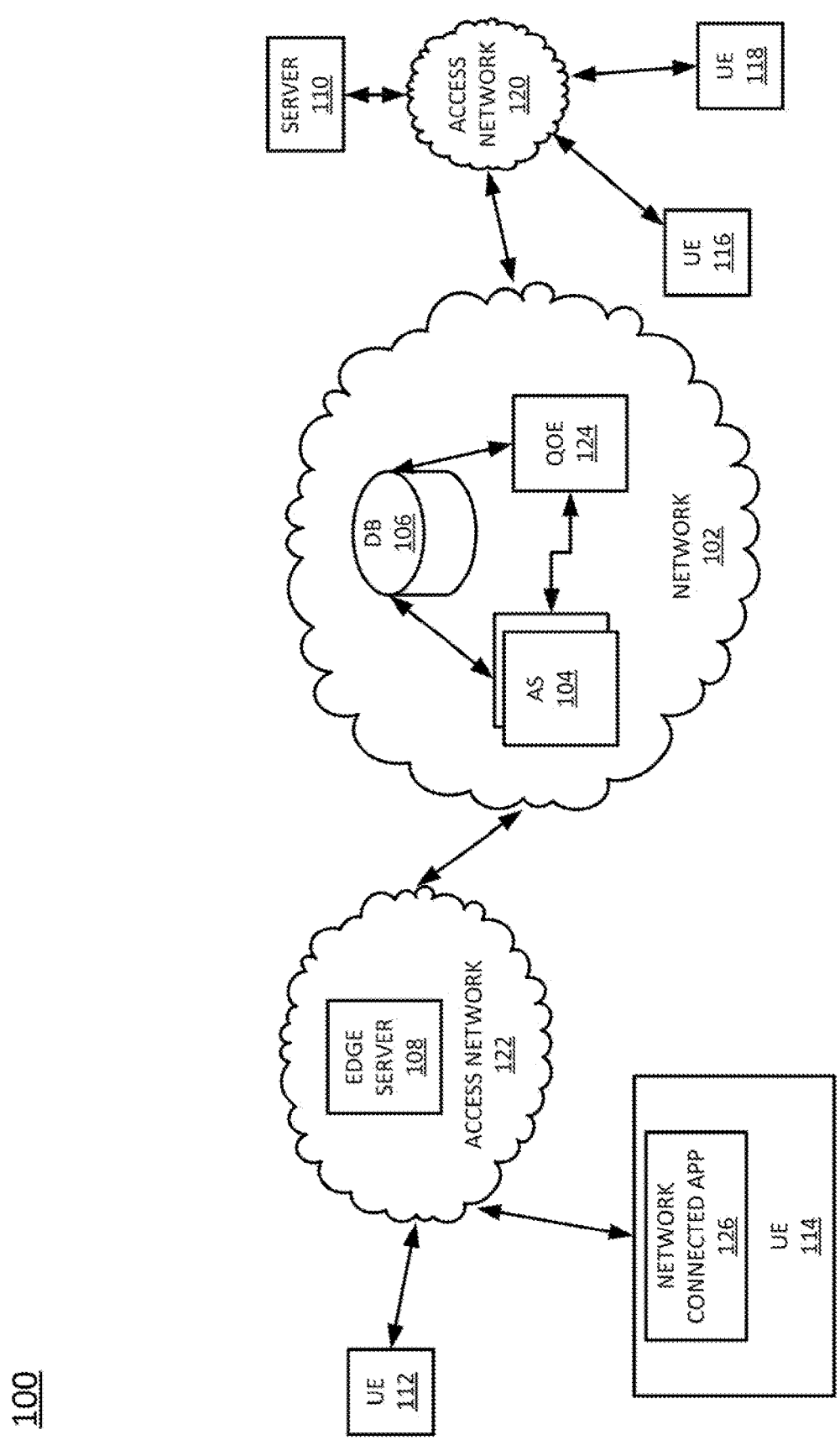
FIG. 1 illustrates an example system in which examples of the present disclosure may operate.

In one example, the present disclosure optimizes quality of experience to meet variable network demands in a mobile media network. As discussed above, mobile devices (e.g., smart phones, tablet computers, wearable devices, and the like) are often used to engage with network connected applications, such as streaming music and video applications, gaming applications, and others. At the same time, many of these applications are offering more immersive experiences, such as gaming applications that leverage extended reality (XR) technology, or streaming video applications that can control co-located Internet of Things (IoT) devices. Different applications have different requirements for uplink and downlink latency, throughput, and packet loss rates depending on quality of experience (QoE) targets and/or other performance requirements.

When a user is engaging with a network connected application on his or her mobile device, the network conditions typically remain static or may adjust based on actual or current usage. This can create a less than optimal quality of experience as the demands of the network connected application change over time or as the user switches between multiple different network connected applications having different requirements. Inefficient network utilization may also result as the demands of a network connected application decrease without a corresponding decrease in allocated resources.

Examples of the present disclosure provide dynamic network slicing in a mobile media network by utilizing band-level network application programming interfaces (APIs) with predicted network resource demands. In one example, the future resource needs of a network connected application executing on a user's mobile device may be continuously predicted based on the media content being presented by the network connected application (e.g., streaming video, XR game, etc.), the user's recent activities on the mobile device, and/or activities that are expected to occur in the future on the mobile device (e.g., playback of high bitrate video, gaming event involving multiple players, upload of sensor streams, etc.). Network conditions (as measured from the user's perspective) may be continuously predicted based on the user's location and/or analysis of network metadata and traffic. Based on the predicted resource needs, predicted network conditions, and QoE requirements, the mobile device may be assigned to an appropriate network slice that can provide sufficient resources to meet a required QoE without over allocating resources. As the resource needs of the network connected application change over time, or as the user switches between different network connected applications executing on the mobile device, the mobile device may be dynamically assigned to different network slices that provide different resources, allowing resource allocation to the mobile device to be scaled up or down as needed.

Within the context of the present disclosure, a "network slice" is understood to refer to a set of network resources that collectively provide an end-to-end network that is tailored to fulfill specific requirements. For instance, a plurality of network slices may be configured, where each network slice may provide different performance with respect to one or more key performance indicators (or "KPIs," e.g., throughput, latency, packet loss, etc.). Network slices may also be configured to address the needs of specific applications or types of applications (e.g., providing high upload speeds for streaming high bitrate video, providing encryption for the transmission of sensitive data such as data streams generated by health monitoring sensors, etc.). In 5th generation (5G) mobile networks, a "network slice" is understood to refer even more specifically to a protected channel for one or more devices to privately communicate with a radio access network (RAN). Thus, although "network slice" or simply "slice" is a term of art within the protocol definitions of 5G mobile networks, "network slice" as understood within the context of the present disclosure encompasses both the 5G usage and broader network configurations across protocols and usage. Moreover, although examples of the present disclosure are largely discussed within the context of mobile networks (whose conditions are more likely to see significant variations over time), such examples are also applicable to wired networks. These and other aspects of the present disclosure are described in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 4:
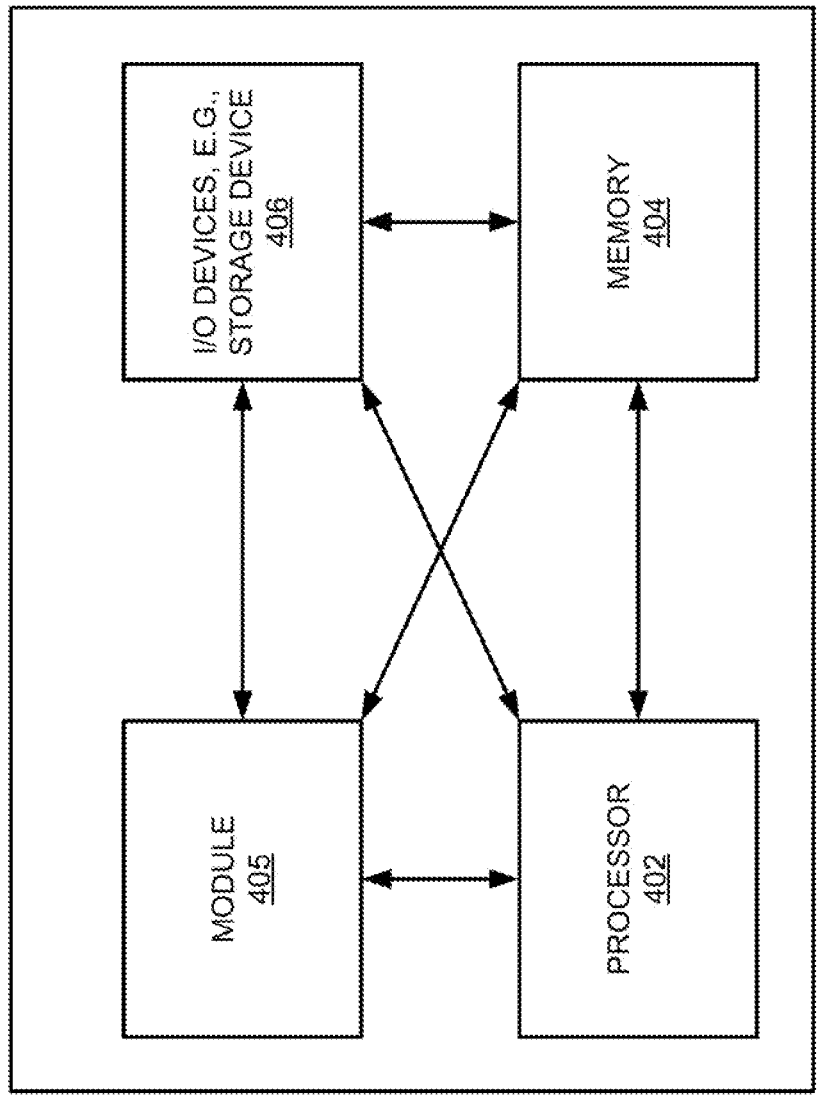
FIG. 4 depicts a high-level block diagram of a computing device specifically programmed to perform the functions described herein.

In accordance with the present disclosure, network 102 may include a plurality of application servers (AS) 104, each of which may comprise computing system or server, such as computing system 400 depicted in FIG. 4, and may be configured to provide one or more operations or functions in connection with an immersive application. For instance, one AS 104 may support a service that streams immersive video, while another AS 104 may support a service that provides an XR gaming experience.

The network 102 may also include a QoE server 124, which may comprise a computing system or server, such as computing system 400 depicted in FIG. 4, and may be configured to provide one or more operations or functions in connection with examples of the present disclosure for optimizing quality of experience to meet variable network demands in a mobile media network. The network 102 may also include one or more databases (DBs) 106 that are communicatively coupled to the AS 104 and the QoE server 124.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single QoE server 124 and a single database (DB) 106 are illustrated in FIG. 1, it should be noted that any number of servers and any number of databases may be deployed, and which may operate in a distributed and/or coordinated manner as a processing system to perform operations in connection with the present disclosure.

In one example, QoE server 124 may comprise a centralized network-based server for dynamically allocating network resources to user endpoint devices executing network connected applications which interact with one or more of the ASs 104. For instance, the QoE server 124 may host an application that continuously monitors conditions within the network 102 and within various network slices of the network 102. In addition, the QoE server 124 may continuously monitor the locations and resource needs of various mobile user endpoint devices (UEs) 112, 114, 116, and 118 that are interacting with the AS 104. Based on changes in the network conditions and/or resource needs, the QoE server 124 may dynamically adjust the resources allocated to one or more of the UEs 112, 114, 116, or 118 (e.g., by at least temporarily reassigning the one or more of the UEs 112, 114, 116, or 118 to a different network slice).

In one example, at least one AS 104 may comprise a physical storage device (e.g., a database server), to store profiles for UEs 112, 114, 116, or 118 and/or users of the UEs 112, 114, 116, or 118. For instance, a profile for a UE might indicate a service tier to which the UE is subscribed, where the service tier may be associated with a minimum and/or maximum amount of network resources that may be allocated to the UE. The profile for a UE may also specify a location history for the UE, including specific locations at which the UE is frequently observed, locations at which the UE is expected to be on specific days and/or at specific times (e.g., a specific office location Mondays through Fridays from 9:00 AM to 5:00 PM local time), routes that the UE is frequently and/or regularly observed to travel (e.g., a commuter train route, and/or network base stations with which the UE is observed to frequently or regularly interact).

In a further example, a profile for a UE may also identify one or more network connected applications that the UE has been observed to execute (e.g., in conjunction with an AS 104). The network connected applications may include immersive applications such as video or music streaming applications, XR gaming applications, and the like. The profile for the UE may further specify ranges of resources required by the network connected applications. For instance, network connected applications may be categorized as "high," "low," "medium," or "variable" in terms of the applications' usage of bandwidth, latency demands, throughput demands, and the like.

In one example, the DB 106 may store the profiles, and the QoE server 124 and/or AS 104 may retrieve the profiles from the DB 106 when needed. For ease of illustration, various additional elements of network 102 are omitted from FIG. 1.

Figure 3:
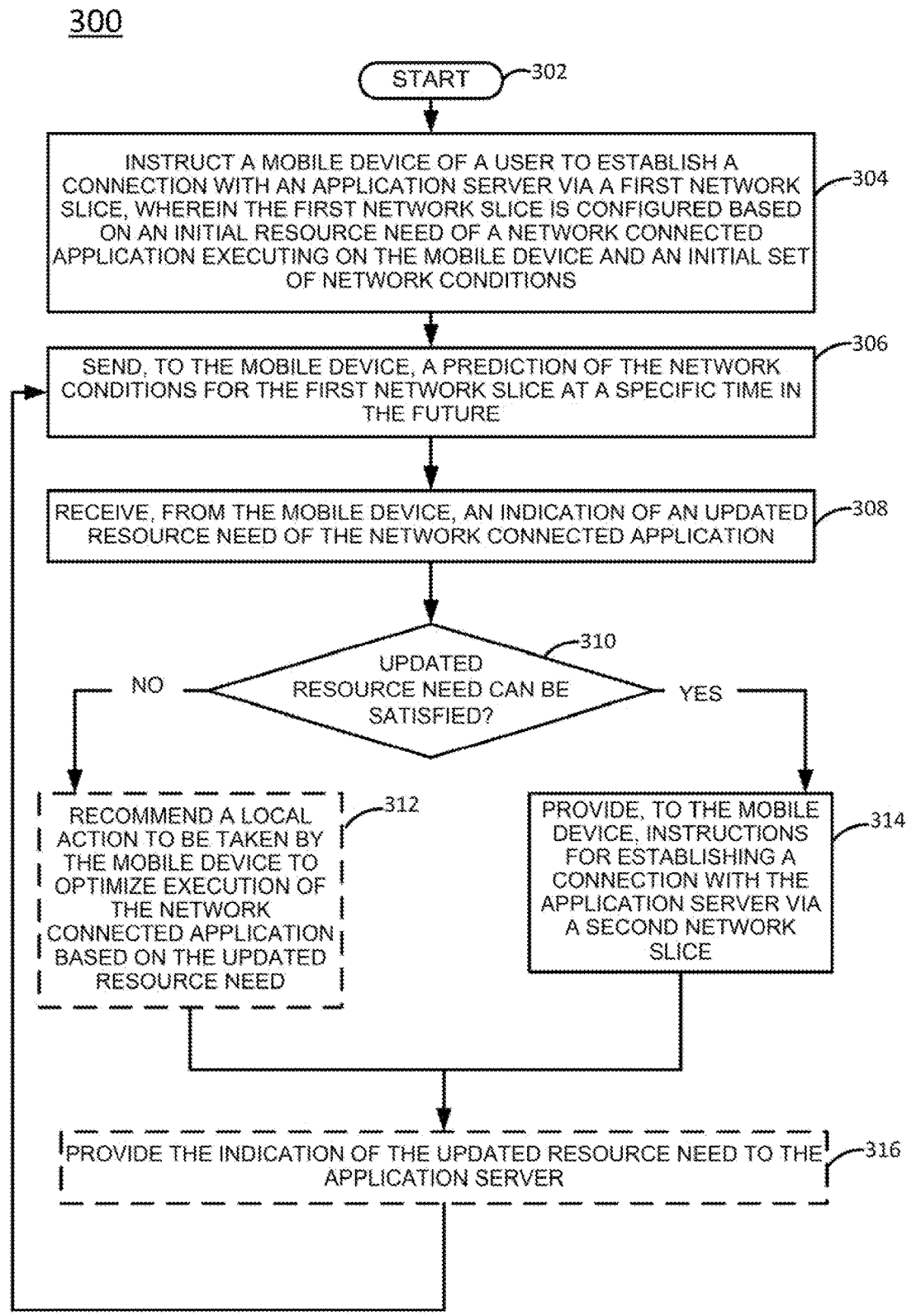
FIG. 3 illustrates a flowchart of another example method for optimizing quality of experience to meet variable network demands in a mobile media network in accordance with the present disclosure.

In one example, access network 122 may include an edge server 108, which may comprise a computing system or server, such as computing system 400 depicted in FIG. 4, and may be configured to provide one or more operations or functions for optimizing quality of experience to meet variable network demands in a mobile media network, as described herein. For instance, an example method 300 for optimizing quality of experience to meet variable network demands in a mobile media network is illustrated in FIG. 3 and described in greater detail below.

In one example, QoE server 124 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

Figure 2:
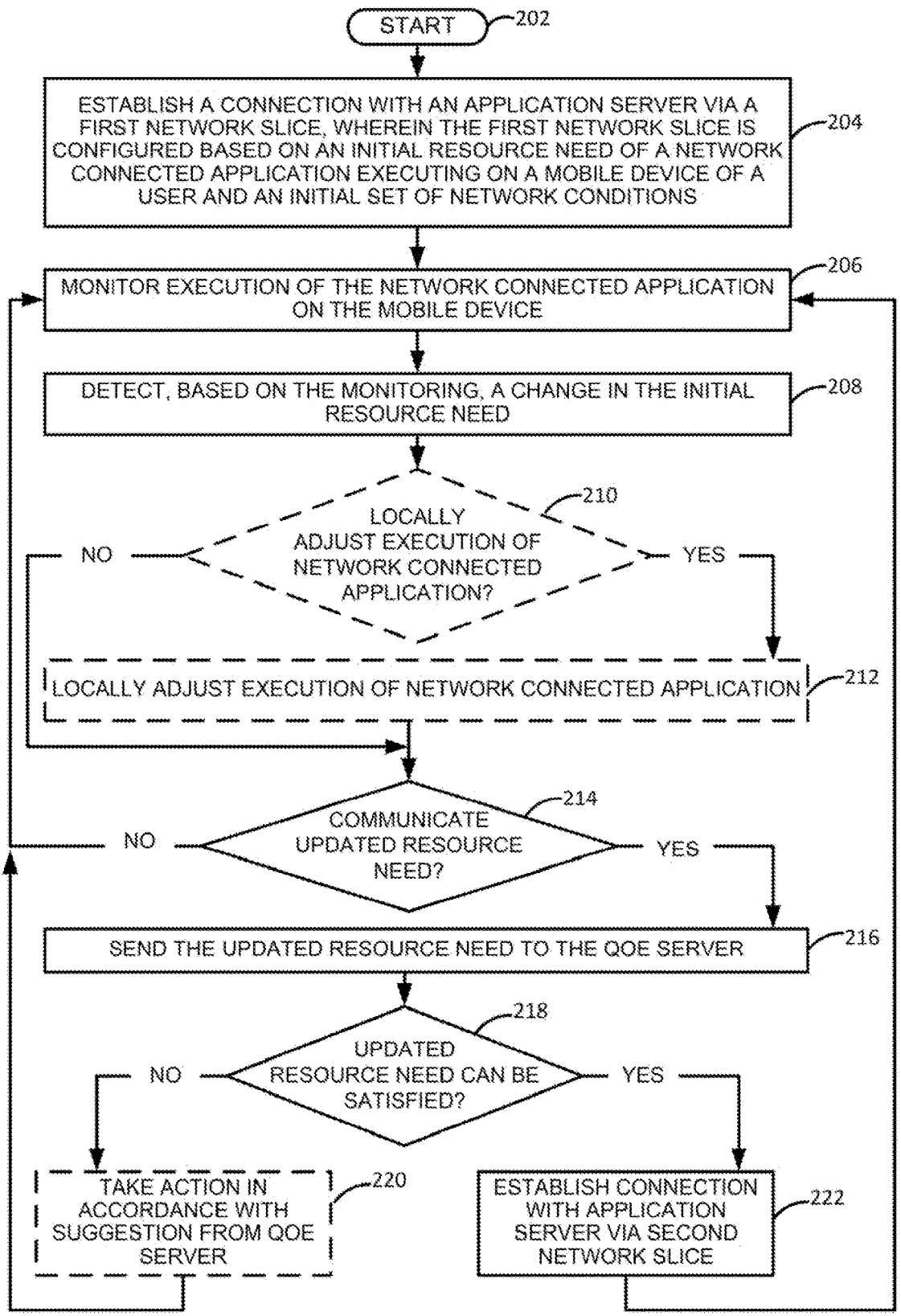
FIG. 2 illustrates a flowchart of an example method for optimizing quality of experience to meet variable network demands in a mobile media network in accordance with the present disclosure.

In one example, the access network 120 may be in communication with a server 110 and with one or UEs, e.g., UEs 116 and 118. Similarly, access network 122 may be in communication with UEs, e.g., UEs 112 and 114. Access networks 120 and 122 may transmit and receive communications between server 110, user endpoint devices 112, 114, 116, and 118, application servers (AS) 104, QoE server 124, other components of network 102, devices reachable via the Internet in general, and so forth. In one example, any or all of the UEs 112, 114, 116, and 118 may comprise a mobile device, a cellular smart phone, a wearable computing device (e.g., smart glasses, a virtual reality (VR) headset or other types of head mounted display, or the like), a laptop computer, a tablet computer, or the like. In one example, any or all of the UEs 112, 114, 116, and 118 may comprise a computing system or device, such as computing system 400 depicted in FIG. 4, and may be configured to provide one or more operations or functions in connection with examples of the present disclosure for optimizing quality of experience to meet variable network demands in a mobile media network, as described herein. For instance, an example method 200 for optimizing quality of experience to meet variable network demands in a mobile media network is illustrated in FIG. 2 and described in greater detail below.

In one example, server 110 may comprise a network-based server for optimizing quality of experience to meet variable network demands in a mobile media network, as described herein. In this regard, server 110 may comprise the same or similar components as those of QoE server 124 and may provide the same or similar functions. Thus, any examples described herein with respect to QoE server 124 may similarly apply to server 110, and vice versa. In particular, server 110 may be a component of a system for optimizing quality of experience to meet variable network demands in a mobile media network which is operated by an entity that is not a telecommunications network operator. For instance, a provider of an immersive application may operate server 110 and may also operate edge server 108 in accordance with an arrangement with a telecommunication service provider offering edge computing resources to third-parties. However, in another example, a telecommunication network service provider may operate network 102 and access network 122, and may also provide a system via QoE server 124 and edge server 108. For instance, in such an example, the system embodied in the QoE server 124 may comprise an additional service that may be offered to subscribers, e.g., in addition to network access services, telephony services, traditional television services, media content delivery service, and so forth.

In an illustrative example, an immersive network connected application may be provided via AS 104 and edge server 108. In one example, a user may engage the network connected application 126 via software installed on user endpoint device 114 to establish one or more sessions with the immersive network connected application, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between user endpoint device 114 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, user endpoint device 114 may communicate with access network 122, network 102, the Internet in general, etc., via a WLAN that interfaces with access network 122.

In addition, the user may engage a dynamic resource allocation system via a separate session, e.g., a connection to edge server 108 (or a connection to edge server 108 and a connection to QoE server 124). Communications between user endpoint device 114 and edge server 108, or between user endpoint device 114 and QoE server 124 may involve any of the communication modalities described above. Thus, the UE 114 may simultaneously engage in a first session with the AS 104 to execute the network connected application 126 and a second session with the QoE server 124 to ensure optimal QoE of the first session.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

To further aid in understanding the present disclosure, FIG. 2 illustrates a flowchart of an example method 200 for optimizing quality of experience to meet variable network demands in a mobile media network in accordance with the present disclosure. In particular, the method 200 provides a method by which a mobile device executing one or more network connected applications may vary the network slice by which the mobile device connects to the network-side application server(s) with which the one or more network connected applications interact. In one example, the method 200 may be performed by a user endpoint device, such as the one or more of the UEs 112 or 114 illustrated in FIG. 1. However, in other examples, the method 200 may be performed by another device, such as the processor 402 of the system 400 illustrated in FIG. 4. For the sake of example, the method 200 is described as being performed by a processing system.

The method 200 begins in step 202. In step 204, the processing system may establish a connection with an application server via a first network slice, where the first network slice is configured based on an initial resource need of a network connected application executing on a mobile device of a user and an initial set of network conditions. The application server may be a server that interacts with the network connected application executing on the mobile device to provide a service to the user. For instance, the application server may comprise a server that streams videos or music, that controls an XR game, or that supports a social media application. In one example, configuration of the first network slice comprises creating or configuring the first network slice virtually or in software, based on the physical network infrastructure. In another example, however, the first network slice may be selected from among a plurality of network slices that have already been configured and instantiated.

In one example, establishing the connection with the application server may be initiated by sending a message to a QoE server over a dedicated command channel (e.g., a session initiation protocol or "SIP" command channel). In one example, the QoE server may comprise a server, separate from the application server, that is configured to dynamically adjust the network resources that are allocated to the mobile device based on execution of the network connected application on the mobile device.

In one example, the message may specify the initial resource need of the network connected application. The resource need of the network connected application may vary depending on the nature of the network connected application (e.g., streaming video, XR game, etc.) that is currently executing on the mobile device. In one example, the resource need may specify a minimum network performance that the network connected application requires in order to maintain a desired QoE in connection with execution of the network connected application.

In one example, the message may alternatively or additionally include the current location (e.g., global positioning system coordinates or the like) of the mobile device, an identifier (e.g., name) of the network connected application, a type (e.g., streaming video, streaming music, XR game, etc.) of the network connected application, a profile of the user of the mobile device (or an identifier that allows the processing system to retrieve the profile from a database), a service tier associated with the mobile device and/or the user (e.g., maximum or minimum allowable data rate or bandwidth based on subscription package), and/or other information.

In one example, data describing the initial set of network conditions may be sent to the processing system by the QoE server in response to the message sent by the processing system. In one example, the data describing the initial set of network conditions may include the signal strength that the processing system is currently experiencing. In a further example, the data describing the initial set of network conditions may include a set of measured KPIs, such as throughput, latency, packet loss, and the like, where the KPIs were measured in the network within a defined period of time (e.g., x seconds) prior to being sent by the QoE server. In one example, the defined period of time is relatively short (e.g., as close to real time as possible, given the network conditions) to minimize any differences between the initial set of network conditions and the actual current network conditions.

In a further example, the data describing the initial set of network conditions may also include a number of compute cycles which are available in the cloud (e.g., in the core network 102 of FIG. 1) or at the network edge (e.g., at the edge server 108 of FIG. 1 or elsewhere in the access network 122).

In a further example, the data describing the initial set of network conditions may also include an initial prediction of the network conditions for the first network slice at a specific time in the near future (e.g., in x seconds from the current time). In one example, the initial prediction of the network conditions for the first network slice at the specific time in the near future may be predicted based on a network availability (e.g., signal strength) map, historical and current network traffic within the first network slice, and/or a trajectory representing a predicted route to be traversed by the user of the mobile device. The route to be traversed by the user may be predicted based on the user's past movements over a defined window of time (e.g., over the last x seconds, over the last y minutes, etc.), based on knowledge of the user's destination (e.g., if the mobile device is currently executing an application that provides navigation or other location-based services), based on routes that the user has previously traversed or destinations that the user has previously visited that are within a defined radius of the current location of the mobile device (e.g., a user profile indicates that the user always stops at the same coffee shop on his or her way to work), and/or based on other data.

In step 206, the processing system may monitor execution of the network connected application on the mobile device. As execution of the network connected application on the mobile device progresses, the resource need of network connected application may increase or decrease relative to the initial network need.

For instance, in one example, monitoring of the execution of the network connected application may include monitoring a progress of a media that the network connected application is playing. As an example, if the media is a video, then the network connected application may identify certain points in the video (e.g., frame numbers or time stamps) where the resources needed to maintain a consistent QoE may vary. These points in the video may be identified by metadata associated with the video. As one example, a high-speed car chase in which fast moving action is depicted may require that the video be streamed at a higher bitrate in order to maintain consistent perceptual visual quality relative to a preceding scene that depicts mostly dialogue.

In another example, monitoring of the execution of the network connected application may include monitoring interaction of the user with the network connected application. As an example, if the media is an XR game, then the network connected application may identify certain points (e.g., events) in the game where the resources needed to maintain a consistent QoE may vary. These points may be triggered by the user taking pre-specified actions, such as interacting with specific objects or characters in the game. As one example, a battle sequence between multiple players including the user may require higher throughput and lower latency in order to maintain a consistent gaming experience relative to a sequence in which the user is simply exploring a location.

In another example, monitoring of the execution of the network connected application may include monitoring the user behavior while the user is using the network connected application. For instance, if the network connected application is a VR game, the processing system may make note of the types of interactions the user tends to seek out (e.g., multiplayer battles) and/or the types of interactions the user tends to avoid or ignore (e.g., searching for items). If the network connected application is a streaming video application, the processing system may make note of the types of scenes that the user tends to skip over (e.g., violence, scary situations, etc.) and/or tends to re-watch (e.g., action scenes, funny moments, etc.). The user behavior may be stored in the profile for the user and may be used to predict future user interactions with network connected applications, which may help to better predict the resource needs of the network connected applications.

In another example, monitoring of the execution of the network connected application may include monitoring the observed network conditions while the user is using the network connected application. As an example, the processing system may monitor the signal strength of the connection between the mobile device and the first network slice. For instance, if the user's location is changing while the user is using the network connected application (e.g., the user is watching streaming video while on a long train ride), the signal strength may vary throughout the use of the network connected application. If the predicted route to be traversed by the user passes through a location where signal strength is known to be weak, this knowledge may be used to adjust the initial resource need as discussed in further detail below.

In another example, during monitoring of the execution of a navigation application of an autonomous vehicle or another device that has location information associated with its operation, the processing system may detect future congestion (e.g., traffic, construction, a navigation speed change that is greater than a threshold change, etc.). The processing system may recognize that additional computing power and bandwidth may be needed in order to understand the congestion and to autonomously plan a solution to reduce the impact of the congestion on the navigation application. In response, the processing system may adjust the initial resource need as discussed in further detail below.

In another example, monitoring of the execution of the network connected application may include monitoring the execution of a plurality of network connected applications on the mobile device, where the user may periodically switch between the plurality of network connected applications. Each network connected application of the plurality of network connected applications may have different resource needs. For instance, the user may start out using a video streaming application that requires high throughput and low latency. At some point during execution of the video streaming application, the user may switch to a social media application which has lower throughput needs and can tolerate higher latency. After a period of time, the user may switch back to the video streaming application, or even to a third network connected application.

In step 208, the processing system may detect, based on the monitoring, a change in the initial resource need. For instance, as discussed above, if the network connected application is an XR game, the processing system may detect a pre-specified user interaction that indicates that a multi-player battle is about to begin, which may in turn require greater throughput and lower latency than specified by the initial resource need. Similarly, if the network connected application is a streaming video application, the processing system may detect that the predicted route to be traversed by the user is about to pass through a location where signal strength is known to be weak, which may require preemptive action in order to avoid video stalls (e.g., pre-caching video chunks of smaller file size in order to store a greater number of video chunks in a buffer).

In optional step 210 (illustrated in phantom), the processing system may determine, based on the detected change in the initial resource need, whether to locally adjust execution of the network connected application (i.e., in order to optimize the overall QoE). If the processing system concludes in step 210 that execution of the network connected application should be locally adjusted, then the method 200 may proceed to step 212.

In optional step 212 (illustrated in phantom), the processing system may locally adjust execution of the network connected application. In one example, locally adjusting execution of the application includes taking an action on the mobile device side to provide optimal or consistent QoE despite the change in the initial resource need. For instance, if the processing system observes that the strength of the signal connecting the mobile device to the first network slice is weakening, or that the predicted route to be traversed by the user is about to pass through a location where signal strength is known to be weak, then the processing system may select a different radio frequency for the connection (e.g., the processing system may switch from a 5G frequency to an LTE frequency, or vice versa).

In another example, if the processing system observes that the strength of the signal connecting the mobile device to the first network slice is weakening, or that the predicted route to be traversed by the user is about to pass through a location where signal strength is known to be weak, then the processing system may adjust the caching of media content and/or reduce the image quality of the media content. For instance, if the network connected application is a streaming video application, the processing system may pre-cache upcoming video chunks encoded at lower bitrates (and having smaller file sizes), so that a greater number of upcoming video chunks may be stored in the mobile device's buffer. Although this may result in temporarily lower video quality, it may ensure that stalls can be avoided until the predicted route to be traversed by the user has entered an area with better signal strength.

In another example, if the processing system observes that network latency is increasing, then the processing system may adjust image warping parameters or make use of foveated rendering or similar techniques when presenting images on the display of the mobile device. For instance, if the network connected application is an XR game, and the mobile device is a head mounted display, the processing system may decrease the image fidelity of the portions of the displayed image that are outside the focus of the user's gaze.

Once the processing system has either locally adjusted execution of the network connected application (in accordance with step 212) or concluded that execution of the network connected application should not be locally adjusted (in accordance with step 210), the method 200 may proceed to step 214.

In step 214, the processing system may determine, based on the detected change in the initial resource need, whether an updated resource need should be communicated to the QoE server. For instance, locally adjusting execution of the network connected application alone may not be sufficient in some cases to maintain a required QoE. In some cases, it may be more effective to additionally or alternatively adjust the network resources allocated to the mobile device. As an example, the user may start out exploring a location in an XR video game. However, after some time, the user may interact with an object or player, where the interaction may trigger a multiplayer battle. In this case, adjusting local execution of the XR video game may not be enough to ensure that the multiplayer battle is rendered consistently and in a manner that satisfies the required QoE; it may be necessary to adjust the network conditions so that the throughput to the mobile device is increased and the latency is decreased.

If the processing system determines in step 214 that an updated resource need should not be communicated to the QoE server, then the method 200 may return to step 206, and the processing system may proceed as described above to monitor execution of the network connected application on the mobile device.

If, however, the processing system determines in step 214 that an updated resource need should be communicated to the QoE server, then the method 200 may proceed to step 216. In step 216, the processing system may send the updated resource need to the QoE server. In one example, the updated resource need may be sent over the same channel (e.g., a dedicated command channel) as over which the message to establish the connection with the application server was sent.

In one example, the updated resource need may be communicated in terms of the timing and context of an expected event that is predicted to change the resource need of the network connected application. For instance, if the network connected application is an XR game, the updated resource need may be communicated as a multiplayer battle (context) which is expected to start in x seconds (timing). Similarly, if the network connected application is a streaming video application, the updated resource need may be communicated as a complex action scene (context) that is expected to begin in x seconds or y frames (timing).

In step 218, the processing system may determine, based on a response from the QoE server, whether the QoE server is able to allocate network resources to satisfy the updated resource need.

For instance, the QoE server may determine that network resources cannot be allocated to satisfy the updated resource need. In this case, the response from the QoE server may suggest one or more alternatives that may help to maintain consistent QoE. For instance, the QoE server may suggest that the mobile device upgrade to a higher service tier that would permit allocation of the necessary network resources. The QoE server may also provide suggestions for routing and/or timing of data to and from the mobile device that may help to provide the necessary QoE. For instance, the QoE server may determine, by monitoring network conditions, that one or more paths over which data is traveling to or from the mobile device are experiencing delays, or that one or more routers on those paths have failed. The QoE server may in this case suggest alternate paths and/or routers over which data to and from the mobile device can be routed.

Alternatively, the QoE server may determine that network resources cannot be allocated to satisfy the updated resource need. In this case, the response from the QoE server may provide instructions for establishing a connection to the application server over a second network slice (of the plurality of network slices) that provides a different set of network resources than the first network slice. For instance, the second network slice may provide greater throughput or lower latency than the first network slice.

If the processing system determines in step 218 that the QoE server is unable to allocate network resources to satisfy the updated resource need, then the method 200 may proceed to optional step 220 (illustrated in phantom). In step 220, the processing system may take action in accordance with a suggestion from the QoE server. For instance, the action may comprise upgrading a service tier to which the mobile device is subscribed, re-routing data to and from the mobile device over a new path and/or through a new set of routers, or the like. In one example, the processing system may also take any one or more of the options described in connection with step 212 to locally adjust execution of the network connected application.

Alternatively, if the processing system determines in step 218 that the QoE server is able to allocate network resources to satisfy the updated resource need, then the method 200 may proceed to step 222. In step 222, the processing system may establish a connection with the application server via a second network slice, where the second network slice is configured based on the updated resource need and a current set of network conditions (or selected from among a plurality of network slices that have already been configured). As discussed above, the second network slice is different from the first network slice in that the first network slice and the second network slice may provide different combinations of network resources.

After the processing system has performed step 220 or step 222, the method 200 may then return to step 206, and the processing system may proceed as described above unless or until the network connected application is terminated (e.g., the user logs out).

FIG. 3 illustrates a flowchart of an example method 300 for optimizing quality of experience to meet variable network demands in a mobile media network in accordance with the present disclosure. In particular, the method 300 provides a method by which a network-side QoE server may dynamically vary the network slice to which a mobile device executing one or more network connected applications connects to the network-side application server(s) with which the one or more network connected applications interact. In one example, the method 300 may be performed by a server in communication with one or more UEs, such as one of the UEs 112, 114, 116, or 118 illustrated in FIG. 1. However, in other examples, the method 300 may be performed by another device, such as the processor 402 of the system 400 illustrated in FIG. 4. For the sake of example, the method 300 is described as being performed by a processing system.

The method 300 begins in step 302. In step 304, the processing system may instruct a mobile device of a user to establish a connection with an application server via a first network slice, where the first network slice is configured based on an initial resource need of a network connected application executing on the mobile device and an initial set of network conditions. The application server may be a server that interacts with the network connected application executing on the mobile device to provide a service to the user. For instance, the application server may comprise a server that streams videos or music, that controls an XR game, or that supports a social media application.

In one example, the mobile device may send a message to the processing system over a dedicated command channel (e.g., a session initiation protocol or "SIP" command channel). In one example, the message may specify the initial resource need of the network connected application. The resource need of the network connected application may vary depending on the nature of the network connected application (e.g., streaming video, XR game, etc.) that is currently executing on the mobile device. In one example, the resource need may specify a minimum network performance that the network connected application requires in order to maintain a desired QoE in connection with execution of the network connected application.

In one example, the message may alternatively or additionally include the current location (e.g., global positioning system coordinates or the like) of the mobile device, an identifier (e.g., name) of the network connected application, a type (e.g., streaming video, streaming music, XR game, etc.) of the network connected application, a profile of the user of the mobile device (or an identifier that allows the processing system to retrieve the profile from a database), a service tier associated with the mobile device and/or the user (e.g., maximum or minimum allowable data rate or bandwidth based on subscription package), and/or other information.

When configuring the first network slice (or selecting the first network slice from among a plurality of network slices that have already been configured), the processing system may send data describing the initial set of network conditions to the mobile device in response to the message. In one example, the data describing the initial set of network conditions may include the signal strength that the mobile device is currently experiencing. In a further example, the data describing the initial set of network conditions may include a set of measured KPIs, such as throughput, latency, packet loss, and the like, where the KPIs were measured in the network within a defined period of time (e.g., x seconds) prior to being sent by the processing system. In one example, the defined period of time is relatively short (e.g., as close to real time as possible, given the network conditions) to minimize any differences between the initial set of network conditions and the actual current network conditions.

In a further example, the data describing the initial set of network conditions may also include an initial prediction of the network conditions for the first network slice at a specific time in the near future (e.g., in x seconds from the current time). In one example, the initial prediction of the network conditions for the first network slice at the specific time in the near future may be predicted based on a network availability (e.g., signal strength) map, historical and current network traffic within the first network slice, and/or a trajectory representing a predicted route to be traversed by the user of the mobile device. The route to be traversed by the user may be predicted by the mobile device based on the user's past movements over a defined window of time (e.g., over the last x seconds, over the last y minutes, etc.), based on knowledge of the user's destination (e.g., if the mobile device is currently executing an application that provides navigation or other location-based services), based on routes that the user has previously traversed, or destinations that the user has previously visited that are within a defined radius of the current location of the mobile device (e.g., a user profile indicates that the user always stops at the same coffee shop on his or her way to work), and/or based on other data.

In step 306, the processing system may send, to the mobile device, a prediction (e.g., an updated prediction, if an initial prediction was sent as described above) of the one or more network conditions (broadly at least one network condition) for the first network slice at a time in the future (e.g., a specific time in x seconds from the current time or a range of time in the future, e.g., 20-40 seconds from the current time). For instance, in one example, the processing system may continuously or periodically measure a set of KPIs for the first network slice, such as throughput, latency, packet loss, and the like. Based on the historical measurements for the set of KPIs (e.g., measurements over the last y minutes and/or historical trends in the KPIs over a given windows of time, such as morning, afternoon, evening, and the like), the current measurements for the set of KPIs, current network traffic, historical network traffic trends, and/or knowledge of the user's location and/or a predicted route to be traversed by the user, the processing system may be able to predict what the network conditions for the first network slice will be in x seconds at a specific location (where the specific location may be a location at which the user is expected to be in x seconds). The processing system may send one or more predictions of the one or more network conditions for the first network slice at the time in the future to the mobile device periodically (e.g., specific times such as every y seconds, every z minutes, etc.).

In step 308, the processing system may receive, from the mobile device, an indication of an updated resource need of the network connected application. The updated resource need may reflect a change in the initial resource need described above. For instance, as discussed above, if the network connected application is an XR game, the mobile device may detect a pre-specified user interaction that indicates that a multi-player battle is about to begin, which may in turn require greater throughput and lower latency than specified by the initial resource need. Similarly, if the network connected application is a streaming video application, the mobile device may detect that the predicted route to be traversed by the user is about to pass through a location where signal strength is known to be weak, which may require preemptive action in order to avoid video stalls (e.g., temporary increase in throughput to allow a greater number of upcoming video chunks to be cached in the buffer of the mobile device). In one example, the indication of the updated resource need may be sent over the same channel (e.g., a dedicated command channel) as over which the message to establish the connection with the application server was sent.

In one example, the updated resource need may be communicated in terms of the timing and context of an expected event that is predicted to change the resource need of the network connected application. For instance, if the network connected application is an XR game, the updated resource need may be communicated as a multiplayer battle (context) which is expected to start in x seconds (timing). Similarly, if the network connected application is a streaming video application, the updated resource need may be communicated as a complex action scene (context) that is expected to begin in x seconds or y frames (timing).

In step 310, the processing system may determine, in accordance with updated resource needs from a plurality of other mobile devices executing network connected applications over the plurality of network slice, whether it is possible to allocate network resources to satisfy the updated resource need of the mobile device. For instance, in one example, the processing system may balance allocation of network resources across a plurality of mobile devices including the mobile device and the plurality of other mobile devices. As an example, if more network resources are allocated to the mobile device, this may improve the QoE for the user of the mobile device, but result in worse QoE for a user of another mobile device from whom network resources may have been deallocated (or to whom fewer network resources were allocated in order to provide more resources the user of the mobile device). Different mobile devices of the plurality of mobile devices may be subscribed to different service tiers as well, meaning that the processing system may need to allocate resources in a manner that satisfies different QoE requirements as well as different resource needs. Thus, based on the above considerations, the processing system may or may not be able to allocate network resources to satisfy the updated resource need of the mobile device. In another example, the processing system may not be able to allocate network resources to satisfy the updated resource need of the mobile device if the allocation would exceed a maximum permitted resource allocation that is specified by a service tier to which the mobile device is subscribed.

If the processing system determines in step 310 that it is unable to allocate network resources to satisfy the updated resource need, then the method 300 may proceed to optional step 312 (illustrated in phantom). In step 312, the processing system may recommend a local action to be taken by the mobile device to optimize execution of the network connected application based on the updated resource need. In this case, the local action may comprise one or more alternatives that may help to maintain consistent QoE. For instance, the processing system may suggest that the mobile device upgrade to a higher service tier that would permit allocation of the necessary network resources. The processing system may also provide suggestions for routing and/or timing of data to and from the mobile device that may help to provide the necessary QoE. For instance, the processing system may determine, by monitoring network conditions, that one or more paths over which data is traveling to or from the mobile device are experiencing delays, or that one or more routers on those paths have failed. The processing system may in this case suggest alternate paths and/or routers over which data to and from the mobile device can be routed.

In a further example, the processing system may recommend that the mobile device locally adjust execution of the network connected application. In one example, locally adjusting execution of the application includes taking an action on the mobile device side to provide optimal or consistent QoE despite the change in the initial resource need. For instance, if the processing system observes that the strength of the signal connecting the mobile device to the first network slice is weakening, or that the predicted route to be traversed by the user is about to pass through a location where signal strength is known to be weak, then the processing system may suggest that the mobile device select a different radio frequency for the connection (e.g., switch from a 5G frequency to an LTE frequency, or vice versa).

In another example, if the processing system observes that the strength of the signal connecting the mobile device to the first network slice is weakening, or that the predicted route to be traversed by the user is about to pass through a location where signal strength is known to be weak, then the processing system may suggest that the mobile device adjust the caching of media content and/or reduce the image quality of the media content. For instance, if the network connected application is a streaming video application, the processing system may suggest that the mobile device pre-cache upcoming video chunks encoded at lower bitrates (and having smaller file sizes), so that a greater number of upcoming video chunks may be stored in the mobile device's buffer. Although this may result in temporarily lower video quality, it may ensure that stalls can be avoided until the predicted route to be traversed by the user has entered an area with better signal strength.

In another example, if the processing system observes that network latency is increasing, then the processing system may suggest that the mobile device adjust image warping parameters or make use of foveated rendering or similar techniques when presenting images on the display of the mobile device. For instance, if the network connected application is an XR game, and the mobile device is a head mounted display, the processing system may suggest that the mobile device decrease the image fidelity of the portions of the displayed image that are outside the focus of the user's gaze.

If, however, the processing system determines in step 310 that it is able to allocate network resources to satisfy the updated resource need, then the method 300 may proceed to step 314. In step 314, the processing system may provide, to the mobile device, instructions for establishing a connection to the application server over a second network slice, where the second network slice is configured (or selected from among a plurality of network slices that have already been configured) based on the updated resource need and a current set of network conditions. As discussed above, the second network slice is different from the first network slice in that the first network slice and the second network slice may provide different combinations of network resources. For instance, the second network slice may provide greater throughput or lower latency than the first network slice.

Once the processing system has either recommended a local action for the mobile device to take (in accordance with step 312) or provided the mobile device with instructions for connecting to the application server via a second network slice (in accordance with step 314), the method 300 may proceed to optional step 316.

In optional step 316 (illustrated in phantom), the processing system may provide the indication of the updated resource need to the application server. For instance, if the application server is aware of the updated resource need, then the application server may be able to take actions to maintain consistent QoE for the user of the mobile device. As an example, if the application server is a server that provides a streaming video service, the application server may adjust its streaming strategy to at least the mobile device in order to maintain consistent QoE for the user of the mobile device. Adjusting the streaming strategy may include, for example, utilizing different encoding or compression techniques, utilizing the network edge for transcoding, redirecting the mobile device to a nearby cloud server, and/or other actions.

After the processing system has performed step 312 or 314 (and optionally step 316), the method 300 may then return to step 306, and the processing system may proceed as described above unless or until the network connected application is terminated (e.g., the user logs out).

Thus, the methods 200 and 300 may dynamically vary the network slice to which a mobile device is assigned as a user executes a network connected application on the mobile device. By varying the network slice assignment responsive to changing resource needs of the network connected application or applications (and, potentially, changing network conditions), a more consistent QoE can be provided for the user than is currently achievable utilizing a static set of network resources. Resources can be scaled up when possible to support experiences that place greater demand on the network, and scaled down when the demand decreases to make more resources available for other users who may require them. Although the examples discussed herein may be especially useful when applied to immersive applications (whose resource needs may be subject to greater variation over time than non-immersive applications), such examples may also improve the QoE for non-immersive applications as well.

Moreover, integration of the network and application layers optimizes the allocation resources by monitoring different sets of complementary data. For instance, information such as future network conditions, locations maps (and knowledge of obstacles), user trajectory maps, and most robust network conditions for user location may be collected from the network layer, while information such as user activity and context may be collected from the application layer.

This ability may prove useful in a variety of applications. For instance, a user may be playing an XR game that requires low latency and high throughput at specific points during the game, wherein other points of the game may be able to tolerate higher latency and lower throughput. In this case, a network service (deployed, for instance, via the QoE server described above) would detect when the points that require lower latency and higher throughput are approaching and would provide the necessarily bandwidth until such time as higher throughput and lower latency can be tolerated. For gaming applications, such an approach would support events that requite the transmission of high payload packets. For immersive video applications, such an approach would support caching of video chunks.

In another example, examples of the present disclosure would allow a user to proactively adjust execution of an immersive application for network demands, based on the user's preferences. For instance, the user may not wish to utilize network resources beyond a point at which fees for service upgrades would be required.

In another example, examples of the present disclosure may allow the type of content delivery to be dynamically adjusted for a user who is moving. For instance, based on a prediction of the user's trajectory, examples of the present disclosure may allow for priority caching of the portion of immersive content that is expected to be visible to the user.

In another example, examples of the present disclosure may be used to pre-configure a network for different usage types based on historical data, types of user activities, and location. For instance, different network slices could be configured for use by home users versus users in locations which may be accessible only during certain hours (such as offices, college campuses, gaming centers, and the like).

Moreover, examples of the present disclosure could be extended through the deployment of mobile resources. For instance, in one example, drones or vehicles with mobile antennas may be dynamically deployed to expand a radio access network in specific locations where users may require more resources.

In further examples, intermediate aggregator systems may be deployed to improve understanding of local activity and avoid over adjusting resource allocations for a particular activity. For instance, if two hundred users are watching the same immersive video at the same time, and an action scene (e.g., an explosion) is coming up, it may not be necessary to scale up the resource allocations of all two hundred users individually. Instead, it may be more efficient (from a resource usage perspective) to provide at least the action scene to the two hundred users via a single common rendering pipeline (e.g., as a broadcast).

Further examples of the present disclosure may be integrated with emergency alert systems, smart city systems, connected vehicles, and the like in order to dynamically adjust resource allocations (e.g., allocating more resources to devices located within a defined radius of a natural disaster, a vehicle accident, or the like).

Although not expressly specified above, one or more steps of the method 200 or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 or the method 300 may be implemented as the system 400. For instance, a user endpoint device (such as might be used to perform the method 200) or a server (such as might be used to perform the method 300) could be implemented as illustrated in FIG. 4.

As depicted in FIG. 4, the system 400 comprises a hardware processor element 402, a memory 404, a module 405 for optimizing quality of experience to meet variable network demands in a mobile media network, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for optimizing quality of experience to meet variable network demands in a mobile media network may include circuitry and/or logic for performing special purpose functions relating to the allocation of network resources. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for optimizing quality of experience to meet variable network demands in a mobile media network (e.g., a software program comprising computer-executable instructions) can be loaded into memory 404 and executed by hardware processor element 402 to implement the steps, functions or operations as discussed above in connection with the example method 200 or the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for optimizing quality of experience to meet variable network demands in a mobile media network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
instructing, by a processing system including at least one processor, a mobile device of a user to establish a connection with an application server via a first network slice, where the first network slice is configured based on an initial resource need of a network connected application executing on the mobile device and an initial set of network conditions;
sending, by the processing system to the mobile device, a prediction of at least one network condition for the first network slice at a time in the future;
receiving, by the processing system from the mobile device, an indication of an updated resource need of the network connected application; and
providing, by the processing system to the mobile device, instructions for establishing a connection to the application server over a second network slice, where the second network slice is configured based on the updated resource need and a current set of network conditions.

2. The method of claim 1, wherein the application server comprises a server that interacts with the network connected application executing on the mobile device to provide a service to the mobile device of the user.

3. The method of claim 2, wherein the service comprises an immersive media service.

4. The method of claim 1, wherein the instructing, the sending, the receiving, and the providing are performed over a dedicated command channel that is separate from a channel over which the mobile device communicates with the application server.

5. The method of claim 1, wherein the initial resource need specifies a minimum network performance that the network connected application requires in order to maintain a desired quality of experience in connection with execution of the network connected application at an initial point in time, and wherein the updated resource need specifies a minimum network performance that the network connected application requires in order to maintain the desired quality of experience in connection with execution of the network connected application at a later point in time occurring after the initial point in time.

6. The method of claim 5, wherein the initial resource need further specifies a location of the mobile device at the initial point in time, and the updated resource need further specifies a location of the mobile device at the later point in time.

7. The method of claim 5, wherein the initial resource need further specifies a service tier associated with the mobile device.

8. The method of claim 5, wherein the first network slice is configured by the processing system based at least in part on an initial prediction of the network conditions for the first network slice at another time in the future that is between the initial point in time and the time in the future.

9. The method of claim 8, wherein the initial prediction of the network conditions for the first network slice at the another time in the future is predicted based on at least one of: a network availability map, historical network traffic within the first network slice, current network traffic within the first network slice, or a trajectory representing a predicted route to be traversed by the mobile device of the user.

10. The method of claim 1, wherein the processing system sends, to the mobile device, predictions of the network conditions for the first network slice at specific times in the future periodically.

11. The method of claim 1, wherein the updated resource need is a result of an event occurring in the network connected application.

12. The method of claim 11, wherein the event is an event that requires greater network resources relative to other events in the network connected application in order to maintain a same quality of experience as the other events in the network connected application.

13. The method of claim 11, wherein the event is a switch from the network connected application to another network connected application executing on the mobile device.

14. The method of claim 13, wherein the another network connected application has a greater resource need than the network connected application.

15. The method of claim 1, wherein the updated resource need is communicated in terms of a timing and a context of an expected event that is predicted to change the initial resource need of the network connected application.

16. The method of claim 1, wherein the second network slice is configured based at least in part on resource needs of a plurality of other mobile devices executing a plurality of other network connected applications.

17. The method of claim 1, further comprising:
recommending, by the processing system to the mobile device, a local action to be taken by the mobile device to optimize execution of the network connected application based on the updated resource need, when the establishing the connection to the application server over the second network slice cannot fully satisfy the updated resource need, wherein the local action comprises at least one of: upgrading to a higher service tier, sending and receiving data over an alternate path, or sending and receiving data via an alternate router.

18. The method of claim 1, wherein the network conditions comprise compute cycles which are available at at least one of: a core network within which at least one of: the application server and the processing system resides, or an access network via which the mobile device connects to the core network.

19. A non-transitory computer-readable medium storing instructions which, when executed by a processing system including at least one processor, cause the processing system to perform operations, the operations comprising:
instructing a mobile device of a user to establish a connection with an application server via a first network slice, where the first network slice is configured based on an initial resource need of a network connected application executing on the mobile device and an initial set of network conditions;

sending, to the mobile device, a prediction of at least one network condition for the first network slice at a time in the future;

receiving, from the mobile device, an indication of an updated resource need of the network connected application; and providing, to the mobile device, instructions for establishing a connection to the application server over a second network slice, where the second network slice is configured based on the updated resource need and a current set of network conditions.

20. A device comprising:

a processing system including at least one processor; and a computer-readable medium storing instructions which, when executed by the processing system, cause the processing system to perform operations, the operations comprising:

instructing a mobile device of a user to establish a connection with an application server via a first network slice, where the first network slice is configured based on an initial resource need of a network connected application executing on the mobile device and an initial set of network conditions;

sending, to the mobile device, a prediction of at least one network condition for the first network slice at a time in the future;

receiving, from the mobile device, an indication of an updated resource need of the network connected application; and providing, to the mobile device, instructions for establishing a connection to the application server over a second network slice, where the second network slice is configured based on the updated resource need and a current set of network conditions.

* * * * *